No. 877,091. PATENTED JAN. 21, 1908.
C. J. KOENIG.
MECHANISM FOR PRODUCING HOLLOW GLASSWARE.
APPLICATION FILED JAN. 31, 1907.
10 SHEETS—SHEET 2.
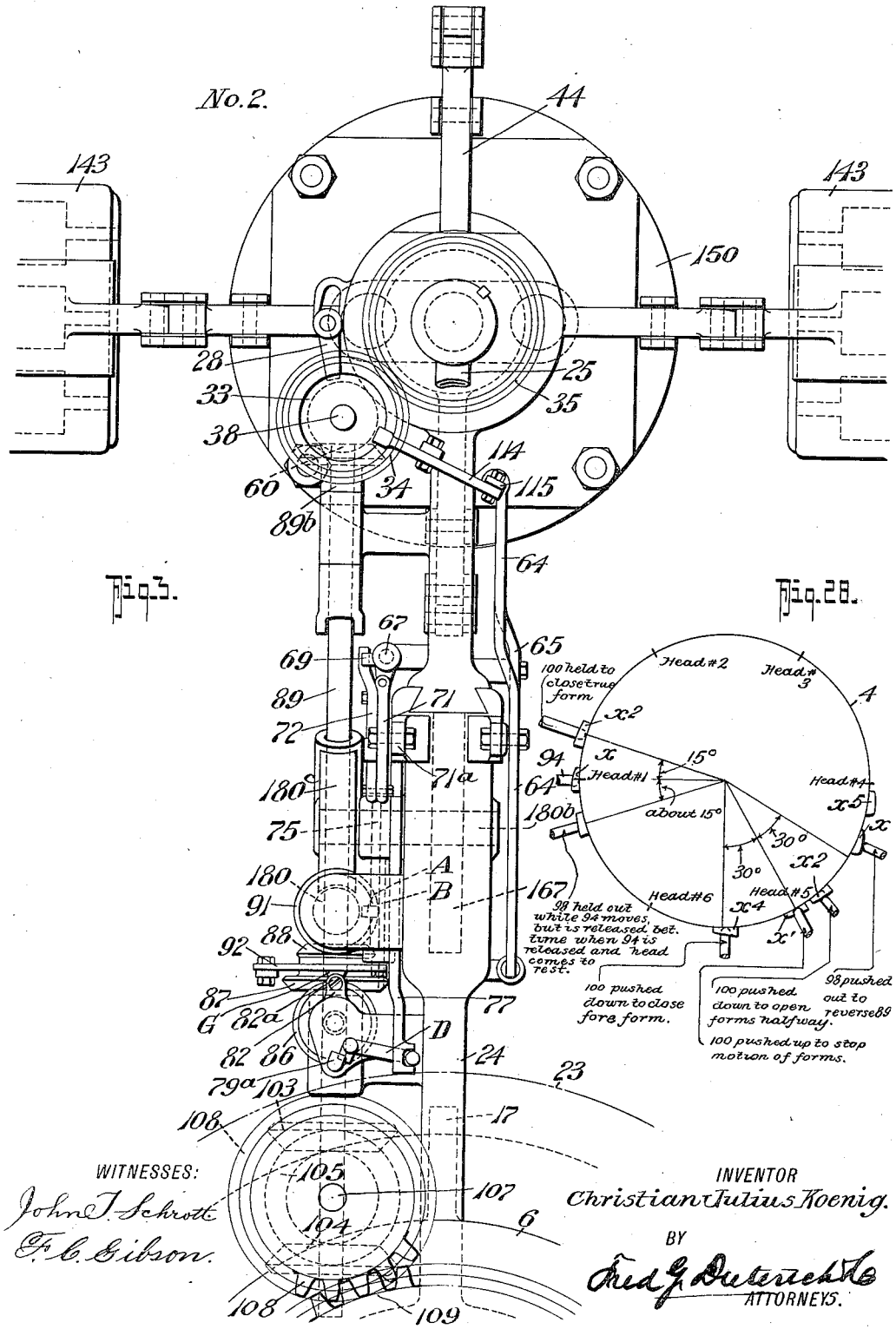

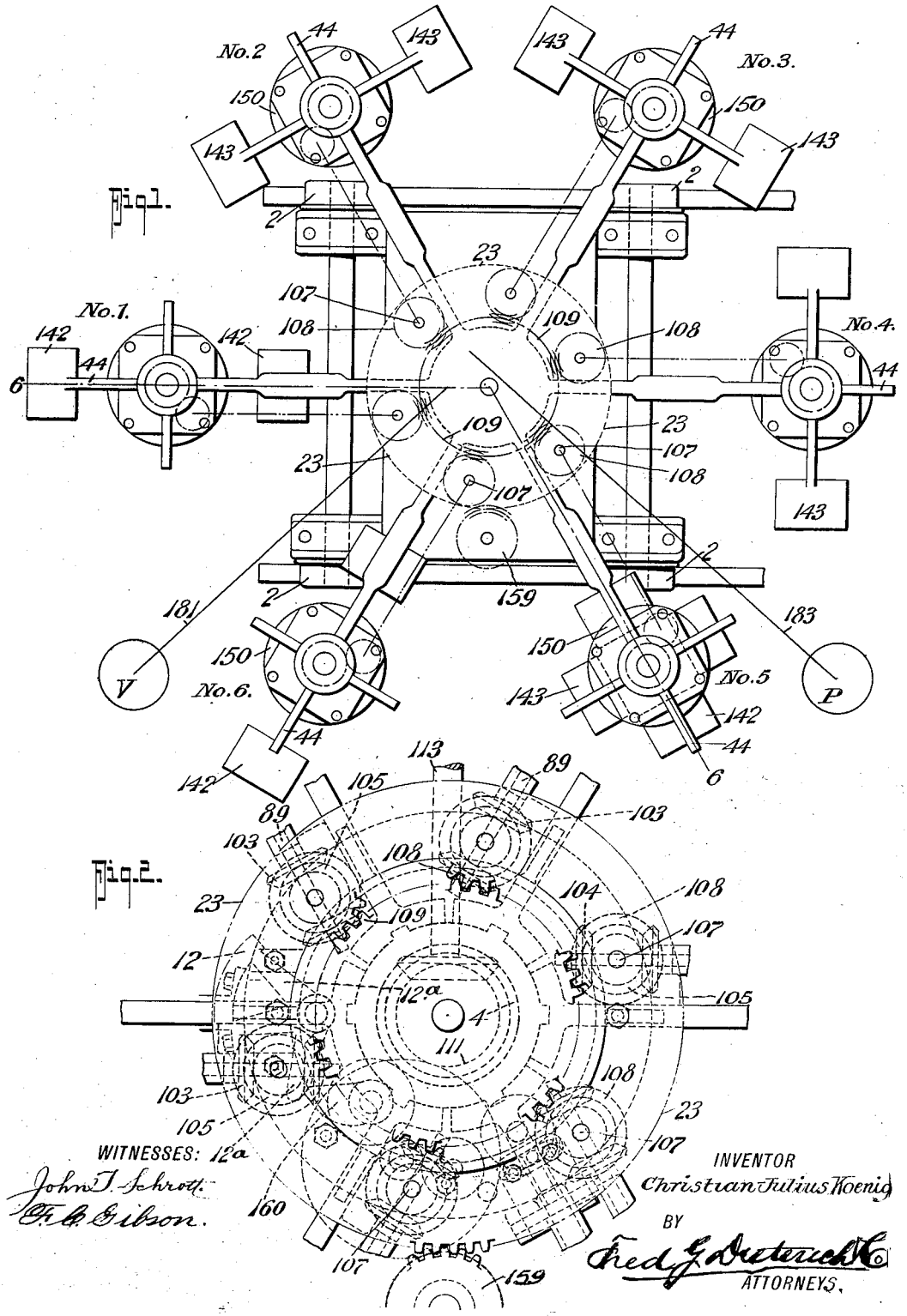

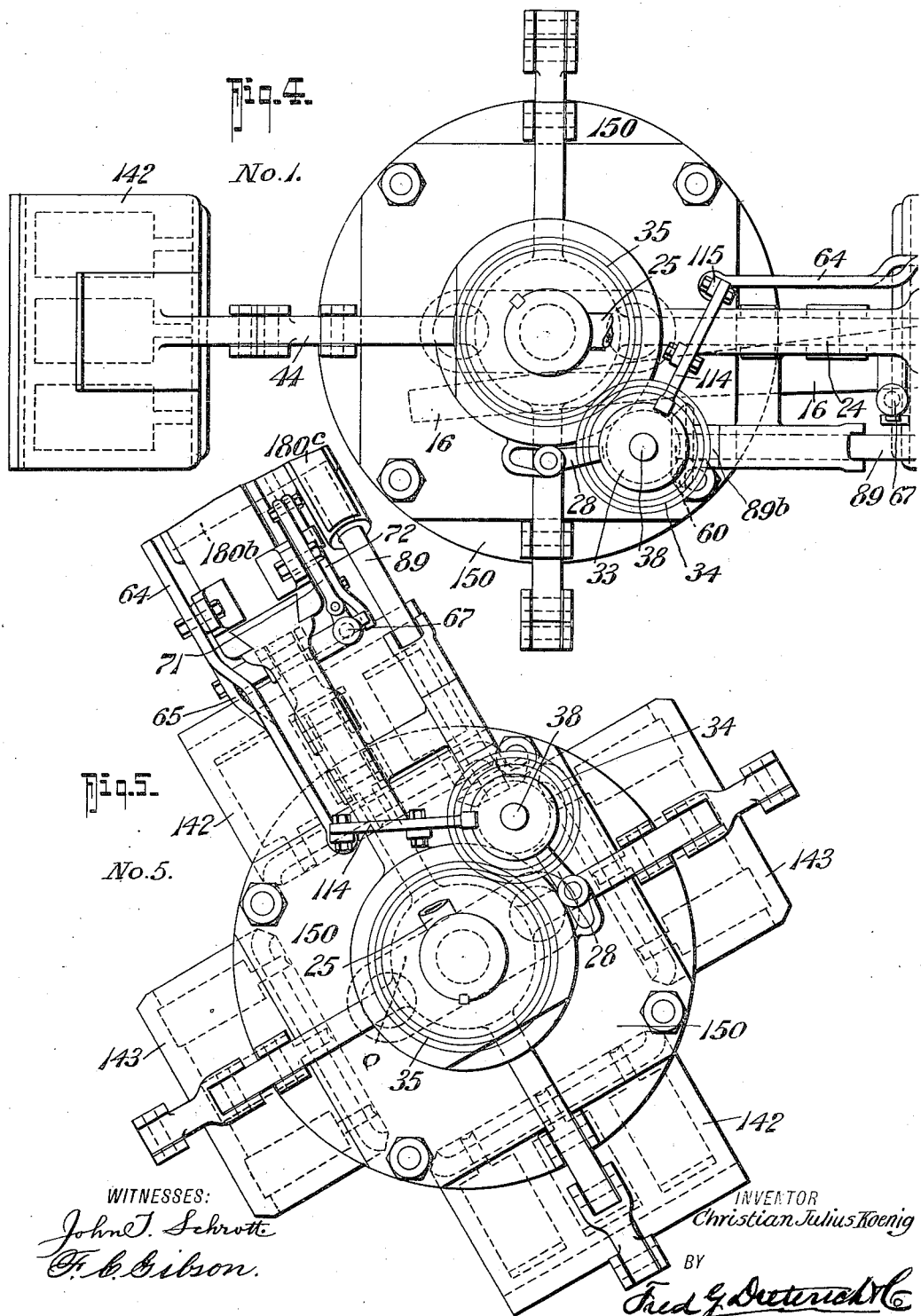

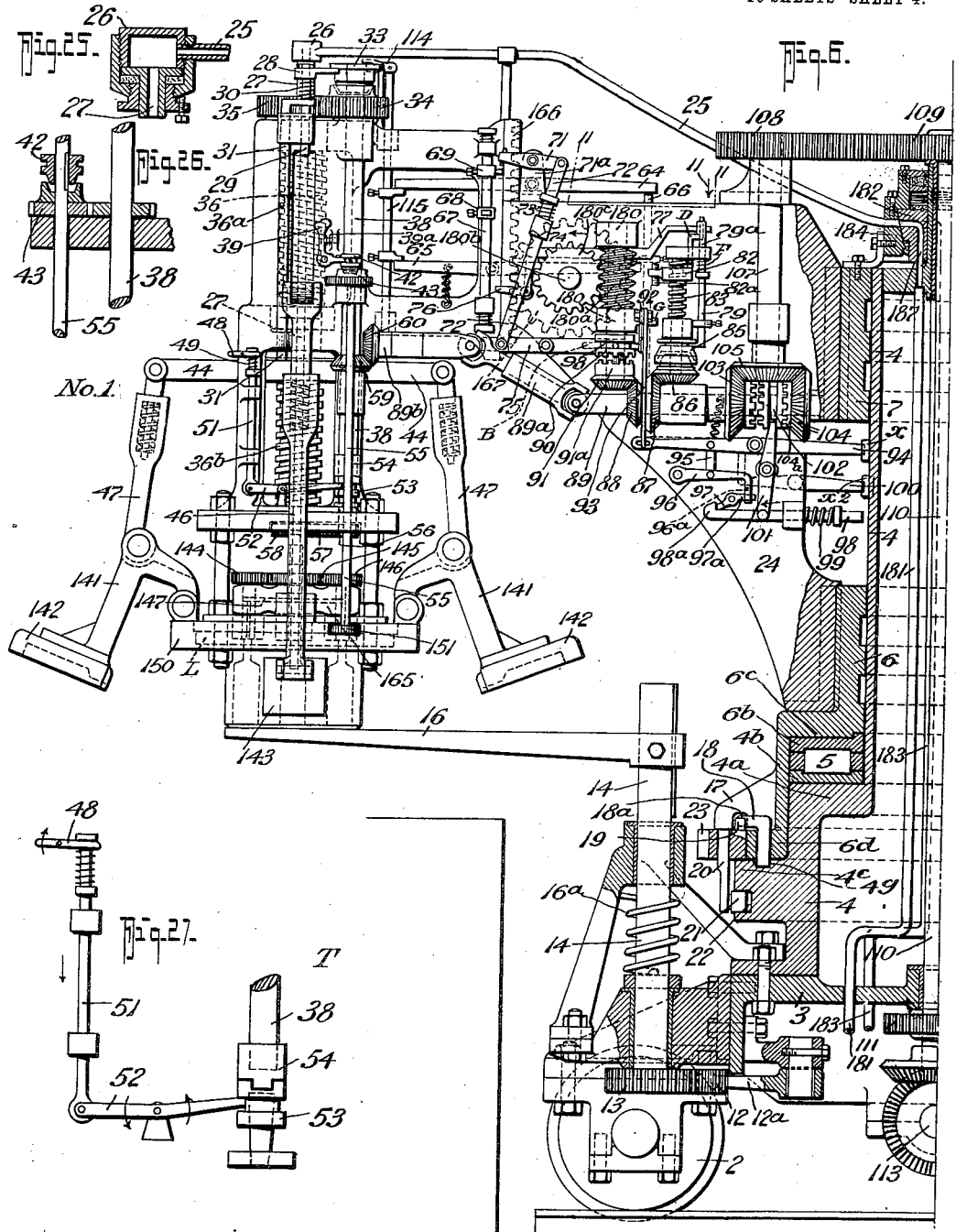

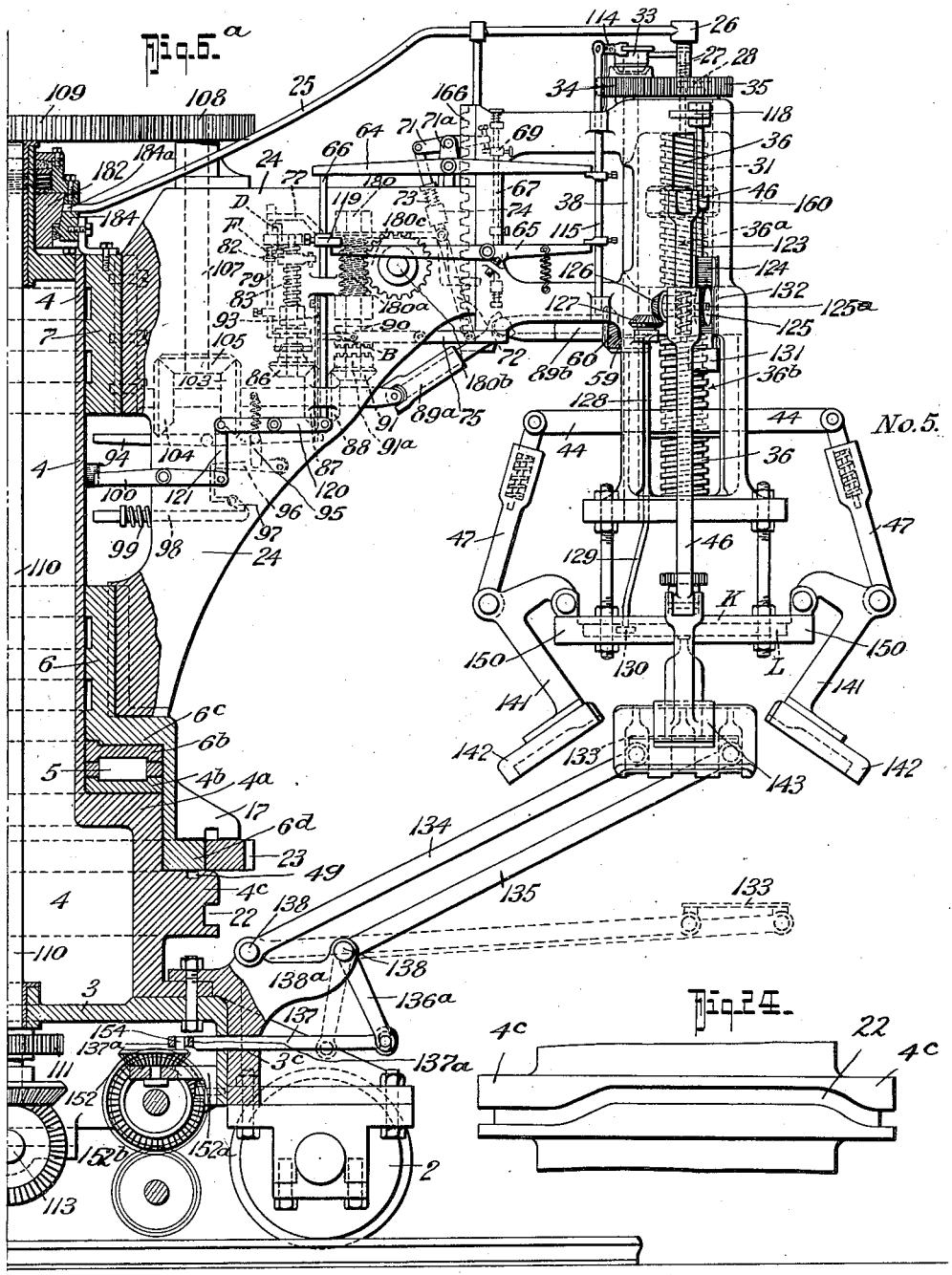

No. 877,091. PATENTED JAN. 21, 1908.
C. J. KOENIG.
MECHANISM FOR PRODUCING HOLLOW GLASSWARE.
APPLICATION FILED JAN. 31, 1907.
10 SHEETS—SHEET 6.
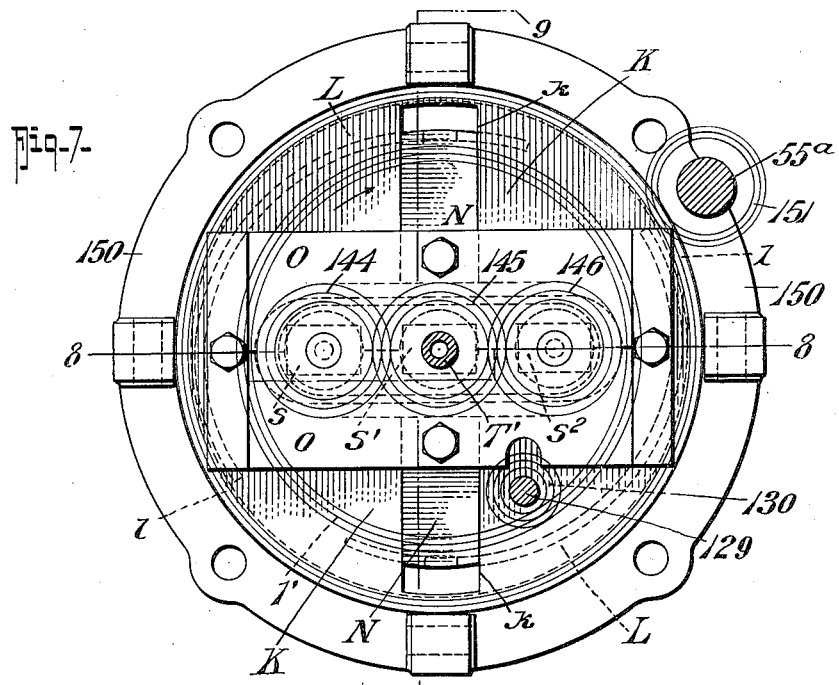
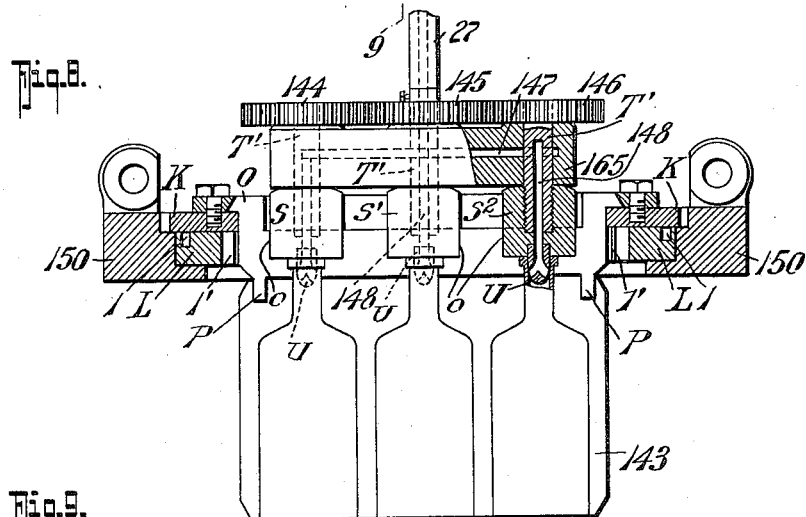
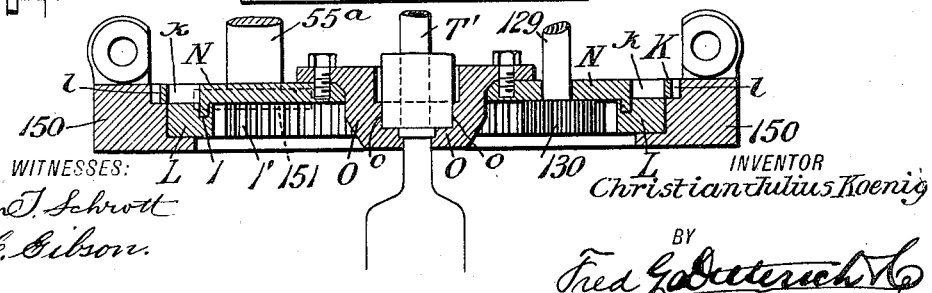
WITNESSES:
John T. Schrott
F. C. Gibson
INVENTOR
Christian Julius Koenig
BY
Fred G. Dieterich
ATTORNEYS.

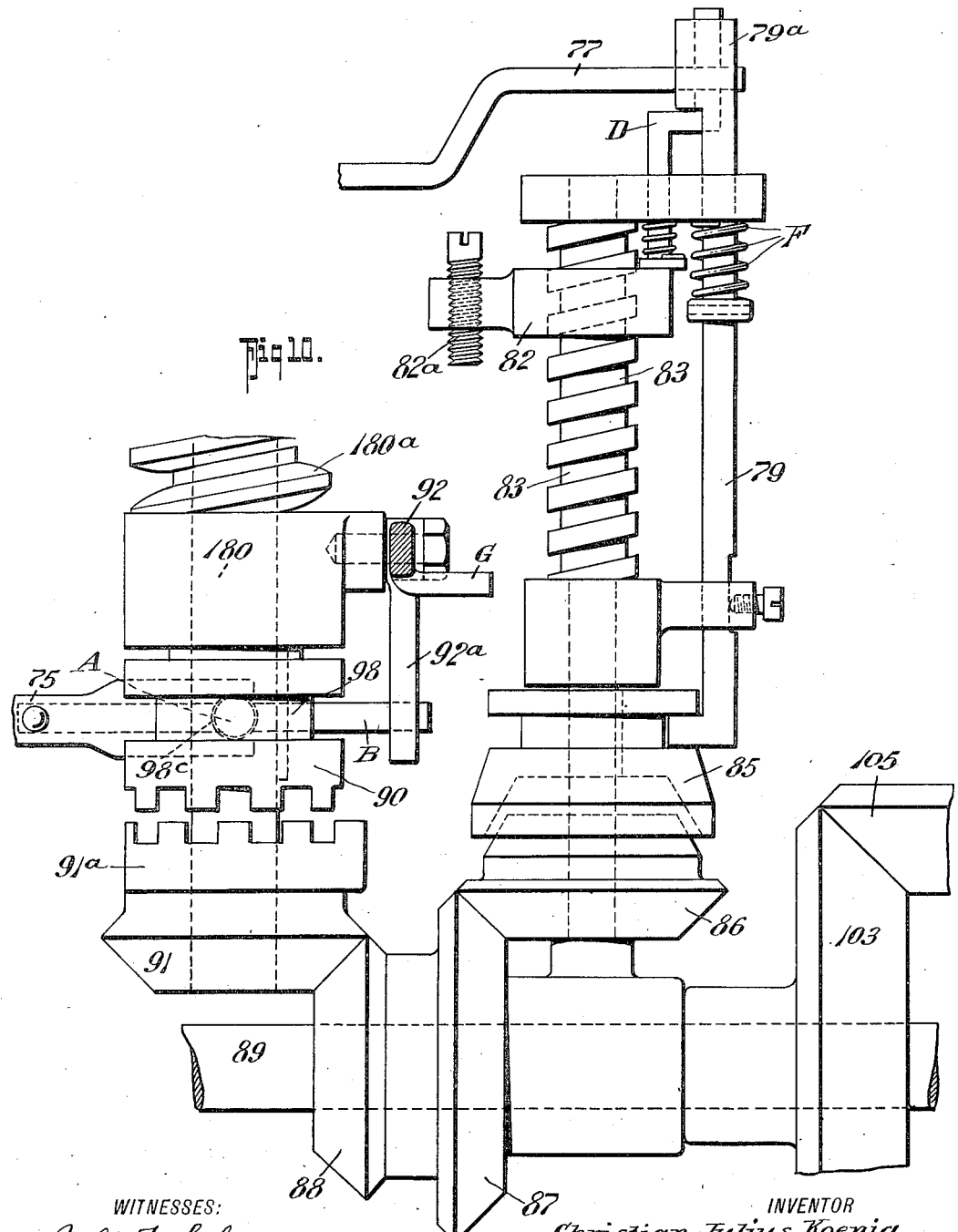

No. 877,091. PATENTED JAN. 21, 1908.
C. J. KOENIG.
MECHANISM FOR PRODUCING HOLLOW GLASSWARE.
APPLICATION FILED JAN. 31, 1907.
10 SHEETS—SHEET 8.
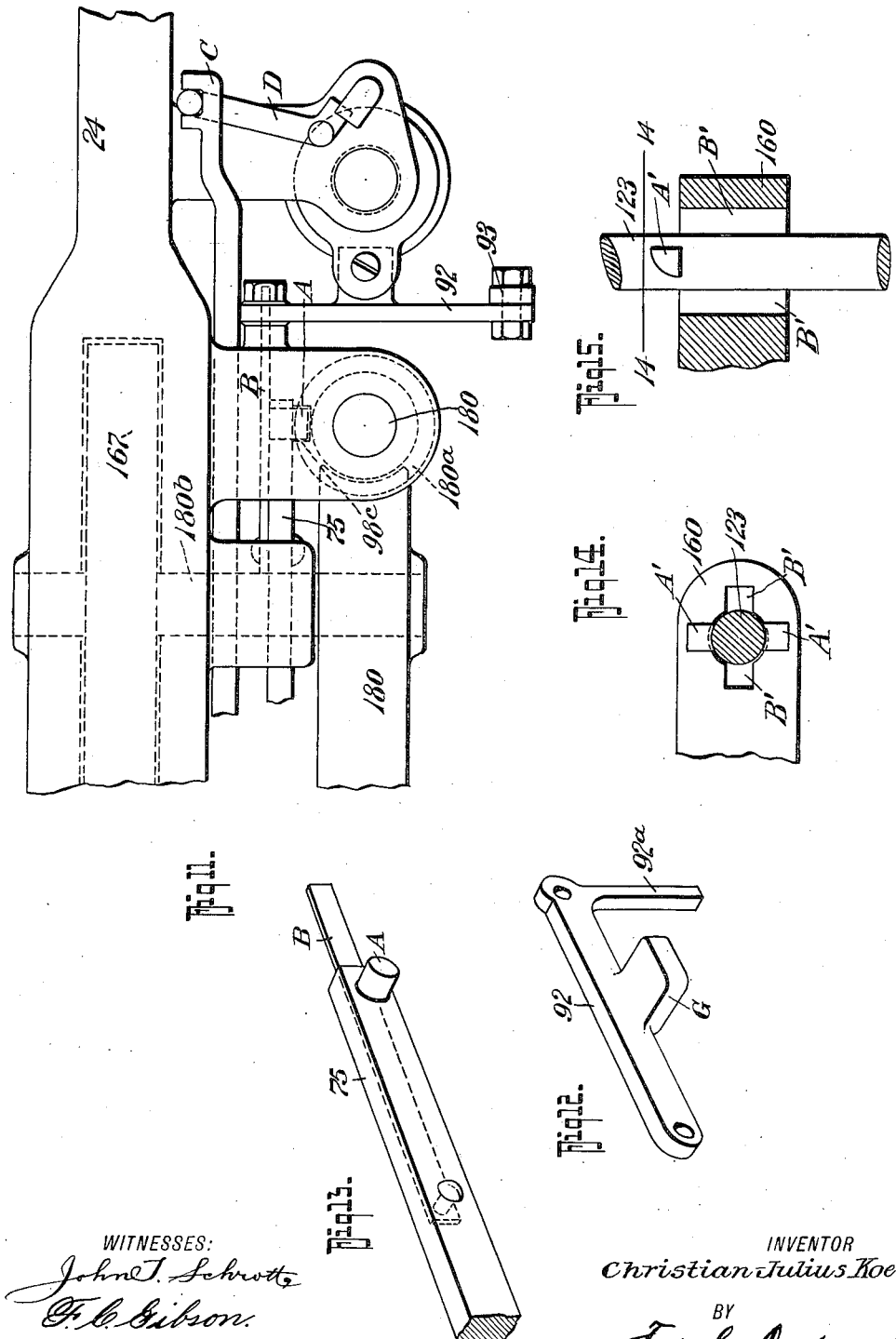
WITNESSES:
John T. Schrott
F. C. Gibson
INVENTOR
Christian Julius Koenig
BY
Fred G. Dieterich
ATTORNEYS.

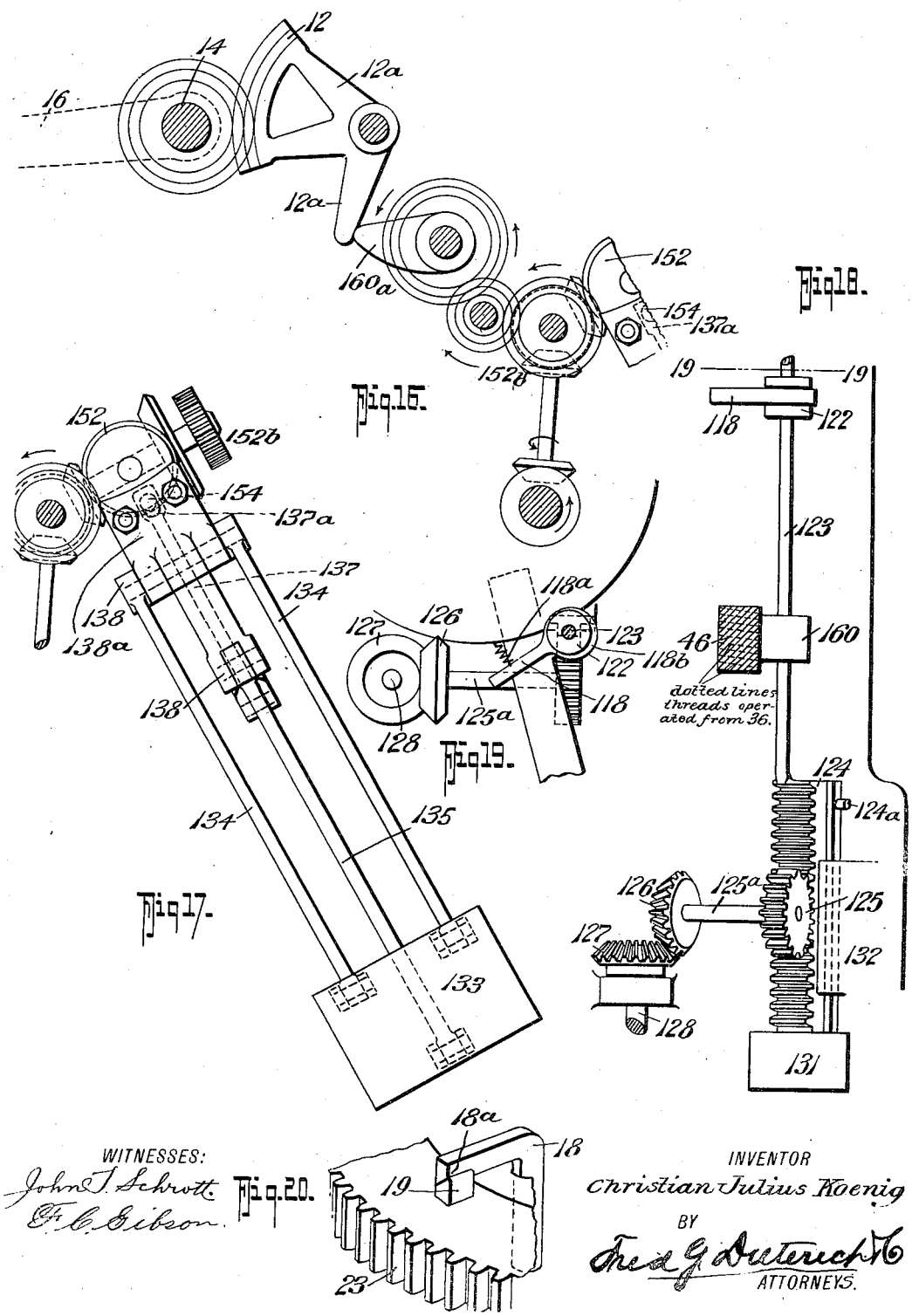

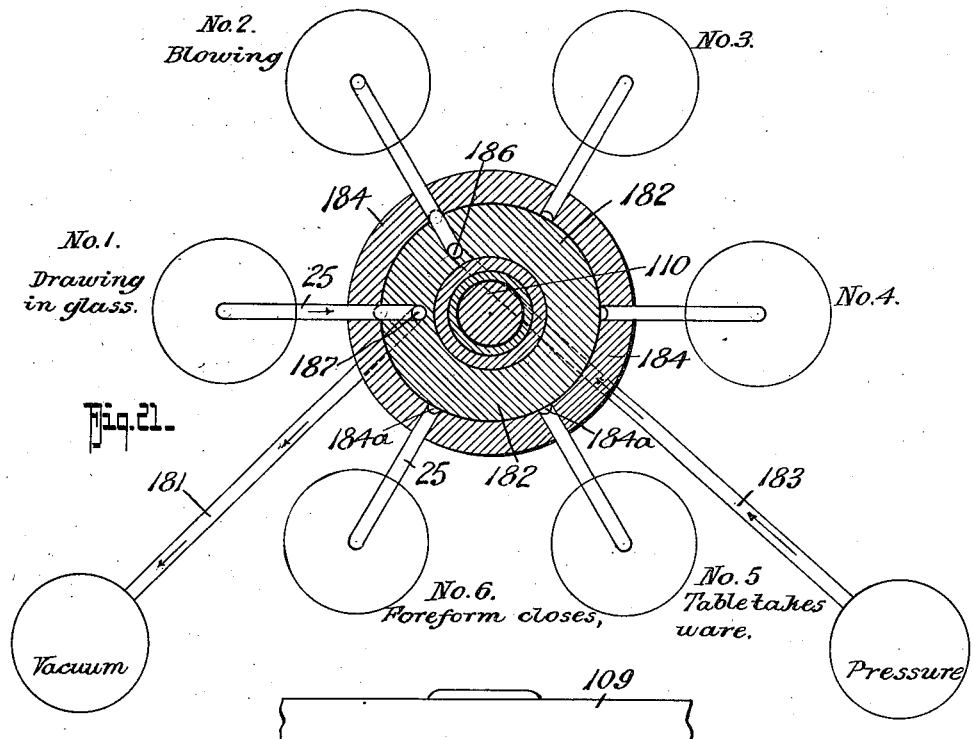
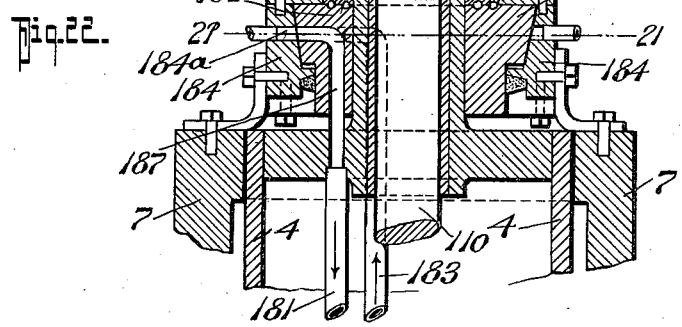
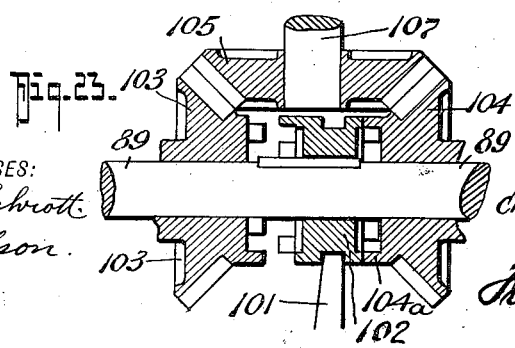

UNITED STATES PATENT OFFICE.

CHRISTIAN JULIUS KOENIG, OF ALTON, ILLINOIS.

MECHANISM FOR PRODUCING HOLLOW GLASSWARE.

No. 877,091.  Specification of Letters Patent.  Patented Jan. 21, 1908.

Application filed January 31, 1907. Serial No. 355,102.

*To all whom it may concern:*

Be it known that I, CHRISTIAN JULIUS KOENIG, residing at Alton, in the county of Madison and State of Illinois, have invented a new and Improved Mechanism for Producing Hollow Glassware, of which the following is a specification.

My present invention has for its purpose the production of hollow glass ware, in which the actuating mechanisms are automatic, whereby the handling of the product is such that the operation of taking up the molten glass, shaping it to a primary form and then shaping it to the final form and then discharging the completely shaped product, are continuous and the several actuating means are so timed and brought into action at predetermined intervals that the operation of the machine is readily controlled and rendered one of great capacity.

My present invention, in its generic nature, embodies the mechanisms broadly disclosed in my co-pending application No. 283,636, filed Oct. 20, 1905, allowed July 9, 1906 and application No. 347,716, filed Dec. 13, 1906, and my said present invention primarily seeks to provide an improved construction of the mechanism generally disclosed in my copending applications aforesaid, having in view the reduction of the cost of construction, the reduction of the several parts and the combining them, whereby the machine will be rendered more compact and simplified and the coöperative arrangement of the various parts, particularly the means for effecting the initial and final shaping of the ware, so designed whereby a maximum production capacity is obtained with a minimum waste or breakage of the material from which the ware is formed.

With the above objects in view and other objects hereinafter made clear, my present invention consists in certain combinations of parts, and details of construction hereinafter fully described, specifically pointed out in the appended claims and illustrated in the accompanying drawings, in which:—

Figure 1, is a diagrammatic plan view that illustrates the general arrangement of the supporting frame, the central column, and the six heads or independent or coöperatively combined mechanism. Fig. 2, is a top plan view of the central part of the complete mechanism and illustrating the connection of the drive gearing of each head or independent set of mechansims, and the connection of the said mechanisms with the main drive gear 109, hereinafter described. Fig. 3, is a top plan view of one of the independent sets of mechanisms which will hereinafter be designated head No. 2. Fig. 4, is a detail top plan view of head No. 1 and showing the parts in the first position, the fore or initial formers being closed and the true or final formers or mold carrying members being open. Fig. 5, is a similar view of head No. 5, the fore form and the true form carrying members being in the mid position, sufficiently open to provide for the removal of the finally shaped production. Figs. 6 and 6ª when read together, illustrate an irregular vertical section of the complete machine, taken substantially on the line 6—6 on Fig. 1, Fig. 6 showing a section of head No. 1 and Fig. 6ª a section of head No. 5. Fig. 7, is a plan view of one of the neck rings, of which there is one for each head or independent sets of mechanism. Fig. 8, is a vertical cross section thereof on the line 8—8 on Fig. 7. Fig. 9, is a similar view, taken at right angles to Fig. 8, see line 9—9 on Fig. 7. Fig. 10, is a detail view on an enlarged scale of the worm screw 180ª, clutch 90 and the gear members that coöperate therewith. Fig. 11, is a detail plan view of the parts, viewed substantially from the line 11—11 in direction of arrow 11, see Fig. 6. Fig. 12, is a detail view of the lever 92 hereinafter referred to. Fig. 13, is a detail view of parts 75, A and B. Fig. 14, is a horizontal section on the line 14—14 of Fig. 15. Fig. 15, is a detail view of the rod 123, with lug A′ and the slotted lug 160. Fig. 16, is a diagrammatic plan view of the mechanism for actuating the cut off or shearing knife. Fig. 17, is a plan view of the ware receiving table and the actuating means connected thereto. Fig. 18, is a detail view of rod 123, rack 124, the gears 125—126—127 and shaft 128 hereinafter referred to. Fig. 19, is a detail plan view, viewed from line 19, Fig. 18. Fig. 20, is a detail view of detent 18 and tripping lug 19 on gear 23. Fig. 21, is a diagrammatic horizontal section on the line 21 of Fig. 22. Fig. 22, is a vertical section of the air controlling mechanism, hereinafter explained. Fig. 23, is a detail section of the clutch devices 102—103—104—105 hereinafter fully described. Fig. 24, is a detail side elevation of the cam member 22, hereinafter referred to. Fig. 24ª is a detail view of the parts 98, 96 and 97 hereinafter specifically referred to. Fig. 25, is a detail section of the parts 25, 26 and 27. Fig. 26, is a detail section of the clutch devices 42 and 43 and the actuating shaft 38 therefor. Fig. 27, is a detail view of the clutch devices 53 and 54 and the actuating devices therefor. Fig. 28, is a diagrammatic plan view of the rotary column 4 and actuating cams hereinafter referred to.

The general arrangement of parts constituting my present mechanism for producing hollow glass ware embodies generally, a suitable portable base, whereby the entire mechanism can be readily moved into position to work in conjunction with a specially constructed furnace and tank, and the ware conveyer, so that when thus positioned, the shaped ware may be readily delivered to and finished at the leers.

Upon the base is fixedly mounted a centrally disposed vertical column and upon this column is rotatably supported a frame which carries a series of independent mechanisms hereinafter termed "heads" each of which operates to produce the finished article or articles during the cycle of movement, the several heads being however coöperatively connected with an actuating means that is common to all of the heads and which automatically effects the successive adjustments of the different devices or sub-mechanisms embodied in each head, at predetermined times, the several heads having such correlative connection with the centrally disposed controlling means, that the several movements necessary to complete one cycle of a head, that is, the movements which occur in the machine at the time that the "head" lowers into the molten glass to draw a charge, delivers the finally shaped ware and then again lowers to the molten material to receive a new charge, are as follows. 1st: Head lowers to take glass. 2nd: Fore form (the initially shaping means) takes glass. 3rd: Head raises out of glass. 4th: Knife cuts off entrailing glass. 5th: Fore form opens and the true form (the final shaping means) closes, and neck ring turns 90°. 6th: Article is blown to final shape. 7th: True form opens half way,—fore form closes half way—said parts being at the midway position and neck ring opens. 8th: Table raises to take finally shaped ware and lowers again with the ware. 9th: Neck ring turns 90° back to the first position. 10th: Final movement. Fore form closes to the mold and true form likewise opens.

Referring now generally to the central or supporting and actuating means and more particularly to Figs. 6 and 6ª of the drawings, 3 designates a supporting base which is mounted upon track wheels 2—2, whereby the entire machine can be readily moved upon the track into position to work in conjunction with the tank T and with suitable conveying means (not shown), for delivering the shaped ware or products to the leers to be finished in any well-known manner. Upon the base 3 is fixedly mounted a stationary hollow column 4, about which the multiple heads,—six being shown—, rotate. On the upper end of the column 4 is mounted a column 7, from which radiate six arms that are bolted at their inner ends to the said collar 7, the latter also serving as a bearing for the upper end of the column 4, as shown. Column 4, near the lower end, has an annular bearing 4ª, upon which is mounted a bearing ring 4ᵇ, upon which seats a number of radially arranged bearing rollers 5 with which engages a bearing ring 6ᵇ mounted on the under side of the annular portion 6ᶜ of a rotary sleeve 6, mounted about the column 4 and held to rest upon the said roller bearings 5, which bearings and the base of the column 4 support the entire weight of the six radially extended arms 24, the upper ends of which are bolted to the collar 7, as shown. At the lower end, the member 6 has an annular flange 6ᵈ, around which turns a cog gear 23 which is supported upon an annular frame 4ᶜ on the member 4.

The gear 23 is driven by a spur 159, as best shown in Figs. 1 and 2 and the gear 159 receives motion through suitable intermediate gearing from the gear 111 see Fig. 2 mounted on the lower end of the main shaft 110 from which power for all the movements of the several mechanisms, hereinafter explained, is taken, and which in turn receives its power from the motor driven shaft 113, as clearly shown in the drawings. The drive shaft 110 extends up through the hollow column 4 and at the upper end it carries a spur gear 109 that meshes with and imparts motion to the six gears 108 mounted on the short vertical shafts 107 that are supported one on each of the radial arms or frames 24.

Each shaft 107 carries a bevel gear 105 at the lower end as clearly shown in Figs. 6 and 23, from which it will be seen that the said gears 105 mesh with bevel gears 103—104 that are loosely mounted on the short horizontal shaft 89 which is suitably mounted on the arm or frame 24 and which carries a shifting clutch 102 having a feather and spline connection with the said shaft 89 and which is adapted to be moved into engagement with either one of the gears 103—104 to provide for imparting reverse motion to the shaft 107, the said parts 103, 104, 102 and 105 forming the reversing mechanism which is automatically controlled at predetermined times in the manner presently explained.

87 and 88 indicate beveled gears that are fixedly mounted on the shaft 89, one of which, 87, meshes with a bevel gear 86 that is loosely mounted on the lower end of a screw shaft 83 and the other gear 88 meshes with a bevel gear 91 mounted on the lower end of a worm shaft 180, as clearly shown in Figs. 6 and 10, it being understood that a similar set of devices or sub-mechanisms as those generally referred to and shown in Fig. 6 are included in each of the six "heads".

38 designates a vertically disposed shaft that is driven from the shaft 89 by a beveled pinion 60 on the outer end $89^b$ of the shaft, which includes an intermediate section $89^a$, the several sections of the shaft having universal joints as clearly shown in Fig. 6, the beveled pinion 60 meshing with a similar pinion 59 on the shaft 38. The shaft 38 is however, only driven from the shaft 89 when the clutch 33 mounted on the upper end of the said shaft, and which will hereinafter be fully described, is thrown into action.

94 and 100 indicate levers and 98 designates a sliding bar, said bar and the levers 94 and 100 moving with the head as it rotates about the stationary collar and the said levers 100 and 94 and the sliding bar 98 are operated by cam projections on the column 4 at predetermined times, in the manner and for the purposes hereinafter explained.

Having thus generally outlined the main actuating devices for one of the heads or independent sets of mechanism, a detailed description thereof is best disclosed by now describing the several operations or movements of the complete machine in a complete cycle.

*First movement—Head lowers into the molten glass in tank T.*—Referring now to head No. 1, as it is moved and just before it moves out of the position shown in Fig. 1 of the drawings, lever 94 engages the cam $x$ on the column 4 (see Fig. 28) and thereby shifts bar 93, which causes the lever 92 (see Figs. 6, 11, 12) to press upon the spring B which lifts a stop A out of a seat 98 in a clutch member 90, slidably mounted upon the shaft 180, as clearly shown in Fig. 6 & 10 and thereby releases said clutch and permits it to drop into engagement with a clutch member $91^a$ of the gear 91 that is driven from the shaft 89, which adjustment of parts sets the worm screw shaft 180 into operation.

At the same time that the arm 94 is engaged by the cam on the column 4 as stated, another cam $x'$ on the said column 4 engages a bar 98 which is thereby pushed back against the tension of a spring 99, mounted upon the said bar 98, which action of the bar 98 operates to swing a lever 101 connected at one end of the bar and midway fulcrumed, into the direction indicated by the arrow on Fig. 6 and since the upper end of the said lever engages the clutch 102, it moves said clutch 102 into engagement with the clutch face $104^a$ of the gear 104, thus providing for setting in motion shaft 89.

Before the machine ceases to rotate, the arm 94 is released, which through the medium of a link arm 95 pivotally secured to the arm 94, pulls the pivoted arm 96 up and throws latch dog 97 pivotally mounted on the frame member 24 and which has a heel $97^a$ working in the slot $96^a$ of the member 96, in front of the heel projection $98^a$ of the bar 98, and thereby holds bar 98 to its rearwardly shifted position and the clutch 102 locked with the clutch gear 104 while the spring 99 on the bar 98 is held compressed.

When the worm shaft 180 is set in motion by the dropping of the clutch 90 into engagement with the clutch gear 91 as stated, movement is imparted to a worm wheel $180^c$ that is keyed to a shaft $180^b$ that carries a large spur gear 167 (see dotted lines on Fig. 6) which meshes with a rack 166 that forms a fixed part of the head frame and through the medium of which the said head frame is shifted vertically, it being understood that when the several parts just described are set in operation, the spur wheel 167 will be rotated in the direction indicated by the arrow on Fig. 6, thereby causing the rack 166 to lower the head to the glass in the tank T. This lowering movement of the head, however, ceases when the lower end of a buffer shaft 67 mounted on the head frame engages the drop arm 75 fulcrumed upon the radial arm or frame member 24 and which co-acts with the clutch 90 in such manner, so as to raise it out of engagement with the clutch gear 91. At this point it should be stated that when the arm 94 causes the stop A to move out of engagement with and release clutch 90, the "head" moved down and caused the stop 69, adjustably mounted on the shaft 67 to engage a lever arm 71, fulcrumed on a bracket $71^a$ mounted on the frame member 24 (see Fig. 6) said lever arm 71 being connected to the lever arm 75 by a link member 72 that is guided in a boss 74 on the frame 24 and which is normally forced in an upward direction by a spring 73, the tension of which serves to move the lever 75 and bring the stop A into position to again engage with the notch $98^c$ of the seat in the clutch 90, thus making it possible that the lever 75 stop the movement, as described.

*Second movement—Fore form takes glass.*—181 designates a pipe, which, in practice, is connected to a vacuum chamber indicated by V on Figs. 1 & 21 and 183 designates a pipe that is suitably connected to a pressure tank indicated by P on Figs. 1 & 21 both tanks being separate from the machine.

182 is a stationary casting mounted on the upper end of the hollow column 4 and 184 is a gland or packing box, secured to the collar 7 to rotate with the head and is so fitted about the casting 182 to form an air tight box, and the said casting 184 also has a series of radially disposed apertures or ports $184^a$ to receive the several air leading pipes 25, of which there is one for each head, and all of which communicate respectively with a blowing or suction member 27 of their respective heads, connected at the upper end with an air pipe bearing or coupling member 26 that join the pipes 27 with their respective blowing or suction heads, as clearly shown in Fig. 6, by reference to which it will also be noticed that the said head 27 passes through a hollow screw 36, presently again referred to, and at the lower end it has an air duct or nozzle U, see Fig. 8.

The vacuum pipe 181 communicates with an air duct 187 in the stationary casting 182 in such manner that at predetermined times the said vacuum pipe is brought into communication with the several leading pipes 25 from the several heads, numbered 1 to 6, it being understood that the adjustments of the head No. 1 and the actuating mechanism that controls the movement thereof is such that when the "head" reaches its lowermost movement and is dipped in the glass, the lead pipe therefor comes into communication with the air duct 187 and thus provides for filling the fore forms of the head No. 1 with the molten glass from the tank T by suction action.

Pipe 25 of the head No. 1 is in communication with duct 187 only so long as the head No. 1 is in the dipped position and it is instantly cut off from the said duct 187 when the said head No. 1 leaves the position shown in Fig. 1 of the drawings while proceeding toward the position shown by head No. 2 since the said duct 187 is now covered by the walls of the rotating casting 184. At this point it should be mentioned when the fore form members 143 are closed, one of the arms 44 that control the swing of the true form members 142 engages a lever 48 and lifts rod 51, held to its downward position by the spring 49, and which is connected at the lower end to a pivoted lever 52 that engages a clutch 53 on the lower end of shaft 38 and moves the said clutch into engagement with an opposing clutch member 54 on a shaft 54ᵃ that carries a gear 56 on the lower end of shaft 54 which sets in motion the gears 57 and 58 and gears 144, 145, 146, for the purposes and in the manner hereinafter more fully described.

*Third movement—Head rises.*—Head No. 1 (and successively the other heads) in the practical operation of my present invention, is allowed to stay in the molten glass in the tank T for 1½ seconds, when it must rise again and this latter movement of the head is accomplished in the following manner. When the stop member 68, which is adjustably mounted on the buffer shaft 67, on the down movement of the head, engaged lever 75 and moved it to throw out the clutch 90, another stop 69 also adjustably mounted on the shaft 67 engaged a bell crank lever 76, see Fig. 6, which, by reason of its connection with a pulling bar 77 shifted said bar to the left and thereby moved a pivoted detent or arm D, (see Fig. 11) out of engagement with the lateral lug or head 79ᵃ of a clutch actuating rod 79, which when released by the member D (see dotted lines Fig. 11) is pulled down by a spring F (see Fig. 6) and thereby moved the clutch 85 in engagement with the clutch pinion 86, and started in motion the screw shaft 83 in such direction that the nut 82 descends until its adjustable stop 82ᵃ engaged a lug G on lever 92 (see Figs. 6 & 11) to which the lever member 93 is pivotally joined, and which includes a pendent member 92ᵃ, by means of which the clutch 90 is released and permitted to drop into engagement with the worm 180ᵃ, such operation of the parts stated again setting in motion worm 180ᵃ, but this time in such direction to cause the head to rise. To effect this latter movement, gear 91 is also caused to turn reversely to its movement when the head was lowered and for such purpose the clutch 102 is disengaged from gear clutch 104 and shifted into engagement with clutch gear 103 which is effected by the stop 82ᵃ pushing down on lug G on lever 92 and causing lever 94 to move and to push down through the link 95, the lever 96 which raises the dog 97, releases bar 98 and allows spring 99 to shift such bar back to the first position and thereby swing lever 101 to shove clutch 102 into engagement with the clutch 103. The reverse movement just referred to occurs when clutch 90 drops into clutch pinion 91, and during such adjustment of parts the "head" is raised until the stop member 69 engages lever 71 and the latter, through the connection 72, tilts lever 75 and again raises clutch 90 out of gear with the opposing clutch member 91 when said motion to the parts stated stops.

During the operation of the parts referred to, the nut 82 that travels on screw 83 when it strikes lug G, reverses the main shaft and thereby reverses motion of the screw 83, which motion is now such to feed nut 83 up until it engages the member D and raises the rod 79 which previously disengaged the clutch 85 and stopped the motion of screw 83.

*Fourth movement—Knife cuts off entrailing glass.*—Referring now more particularly to Fig. 6, it will be seen that the knife 16 is fixedly, but adjustably, mounted on a post 14, mounted in suitable bearings on the base or truck frame, and which carries at the lower end a spur gear 13 that lies in the horizontal plane of, and meshes with a segmental gear 12 on an arm 12ᵃ that bears in a cam 160ᵃ, see Figs. 2 and 18 which is driven from the train of gears mounted in the base, see Figs. 2 and 18. The knife 16 is normally held swung in a position at 90° to the center line of head 1, by means of a spiral spring 16ᵃ until the head rises out of tank T, and when said head has risen to the predetermined height, the cam 160 is swung counter clock-wise and engages the arm 12ᵃ that carries the segment gear 12 and moves said gear to impart the required motion to gear 13 to cause the knife to pass under the fore form and shear off the trailing glass. When the operation referred to is effected, cam 160 disengages the arm 12ᵃ and allows the spring 16ᵃ to rock shaft 14 the gear 13 and segmental gear 12 and the knife 16 back again to the former position i. e.— until the center line of the knife is again 90° to center line of head 1. Shaft 14 which rotates in its bearings, does not rotate about the column 4, it having a fixed position to cooperate with the heads when they reach position No. 1 see Fig. 1. When the fore forms lower to the glass in tank T, the center line is parallel to the center line of the head, but when the true form closes its center line is perpendicular to the center line of the head and therefore the neck ring that supports the glass to be blown, presently again referred to, must be turned through 90° while the fore form opens and the true form closes.

The neck ring mechanism shown in detail in Figs. 7 & 8, after the head rises from the glass, turns through 90° when both the fore and true forms or molds are half-way open or at their mid position, but the said neck ring does not open to release the glass at this time, since it is so designed that it opens at the time when the ware or article being made is finished, and after this action has occurred the mechanism constituting the "head" starts toward position No. 6, see Fig. 1, when the neck ring must again close and turn back 90° to the position it had when head was at position No. 1.

Referring now to Figs. 7, 8 and 9, which show the neck ring and the actuating mechanism therefor, 150 designates a stationary casting having suitable bearings for disks K and I and a cam L. Disk K has guides $k$—$k$ for slides N—N and the said slides carry the neck ring, which is cut into two parts $o$—$o$ and opens and closes on its center or dividing line as the guides are moved outwardly and inwardly in the manner presently explained. Each slide member N has a pendent flange M which engages the cam groove $l$ in such manner that when the cam L revolves relatively to the disk K, the said slide members N—N are reciprocated whereby to open and close the neck ring, as stated. Cam L is actuated by a gear 130 driven by a flexible shaft 129 joined with the shaft 128, said gear 130 engaging the spur gears $l'$ on the inner rim surface of the said cam L as clearly shown on Fig. 9 and Fig. 6ᵃ, and as the said shaft 129 has its bearing on the disk K, the rotation of such shaft does not move the said disk. The opening of the neck ring forms a part of the seventh movement of the complete movements of the machine and therefore the manner in which motion is transmitted to the shaft 129 will be made clear in the detailed description of the said seventh movement. When the neck ring, at the predetermined times, is to be turned through 90° the shaft 55ᵃ is set in motion in the manner hereinafter described and gear 151 on the lower end thereof, see Fig. 6, is rotated, and as this gear engages spur teeth on the peripheral face of disk K, see Fig. 7, said disk K is rotated and carries the cam L, slide members N and neck ring O without relative motion between the said parts, and thereby allows the neck ring members to remain closed. The manner in which motion is stopped when the neck ring has turned 90° will be described later.

S—S'—S² designate three blowing spindles, each being fast on a shaft T', and these shafts T' are rotated while the molds or fore forms are drawing glass, such rotation being by means of gears 144—145—146, one of said shafts or spindles T' being screwed to the lower end of a hollow shaft 27 and locked thereto by a set screw. When clutch 54 is thrown in as before described, while head No. 1 was taking glass and gears 56 and 57 rotated gear 58 and shaft 27, and motion through the several gears is transmitted to the end heads or spindles S—S² that coöperate with the central head S'.

147 on Fig. 8 is a duct in the casting 165 which forms the bearing for members S—S'—S² that communicates with the air ducts on the three heads or spindles S—S'—S² and thus brings all three of said heads S—S'—S² in line with the air suction or blowing members. Each of the heads or spindles S—S'—S² terminates in a nozzle U, through which the air duct 148 leads, as shown, and the said nozzle U and the manner in which it is held for rotation during the suction action prevents the glass from being drawn into the heads or spindles S—S'—S². The members S rest in cavities or sockets $o$ in the parts O to make air tight joints between said parts, since in practice, the neck ring never opens far enough to permit member S to slide off the bottom of cavity O.

*Fifth Movement—Fore form closes and neck ring turns 90°.*—When the entire machine begins to rotate from the position of head 1 to that of head 2 (see Fig. 1) a lever 100, see Fig. 6, is pushed down by a lug $x^2$ on column 4 (see head 5 on Fig. 28) which causes stop 119 (see Fig. 6ᵃ) to move the lever 65 which raises rod 115 and by movement of said rod causes a lever 114 to throw clutch 33 into engagement with clutch gear 34. When the parts are thus adjusted, gear 34 on the shaft 38, driven by the gears 59 and 60, causes the gear 35 to rotate screw 36. Screw 36 has a right hand portion 36ᵃ at the upper end and a left hand portion 36ᵇ at the lower end, and it carries arms 46 and 47 that have threaded portions that engage the upper and lower screw portions respectively, and in such manner that as the screw, which is held in bearings at the top and center, is rotated the said arms 46 and 47 travel in opposite directions and thereby cause the fore form to open as the true form closes. Arms 47 have buffer spring connections with the true and fore form angle arms 141 that serve to hold the forms or molds tightly closed when thus adjusted.

When the several forms or molds are near their mid-position, the neck ring before referred to must turn through 90° and this movement is regulated by the traveling screw arm 46 by reason of the said arm, as it rises, see Fig. 6, coming into contact with a bell crank lever 39 suitably mounted, and which is normally held in the path of travel of arm 46, by a spring 39$^a$, and which, when pushed by arm 46, throws the clutch 42 into engagement with clutch gear 43 and thereby starts shaft 55 and gear 151, the detailed operation of which has heretofore been given.

During the movements just described, shaft 129 does not rotate and the neck ring does not open. It should be stated, that the portion of the arm 46 which comes in contact with lever 39 is so shaped that the said lever is held back only long enough to turn neck ring 90°. The neck ring is brought back to its exact or normal position when the forms or molds close and the projections P on the neck ring O are forced into the cavities in said forms or molds. Clutch 33 is thrown out of gear and movement of screw 36 is stopped when the cross member 44, movable with arms 47, strikes the rod 31.

28 is a short arm loosely mounted on and projected laterally from the shaft 28, and held up by the spring 30, see Fig. 6. At this point it is deemed proper to explain the means for and manner of effecting the intermittent or step-by-step motion of the several heads 1 to 5 about the column 4.

21 designates a roller, mounted on a rod 20, slidable through a vertical aperture in the gear 23, and moves about the column 4 with said gear, and the said roller engages a cam groove 22 in the outer face of the annular flange 4$^c$ of column 4.

17—17 designate lateral projections integral with collar 6, which are so placed that when gear 23 rotates and the cam 22 forces the rod 20 up with the upper end above the gear 23 the said bar comes into contact with the projection 17 and since it, (the rod 20) is locked to turn with the gear 23 motion is imparted to the column 4 and the parts carried thereby. The gears 23 and 20 now continue to move freely until the time for heads to move again when a beveled lug 19 on the gear ring 23 engages the beveled end 18$^a$ of the member 18 and raises it out of the notch 4$^g$ in annular flange 4$^c$, and thus leaves the rotary carrier free to move, when cam 22 immediately raises the member 20 in position to again engage the member 17 when motion of the carrier again begins, the carrier being geared with the said drive mechanism.

When the rotary portion of the machine has moved almost 60° cam 22 draws the member 20 down until its upper end is in a plane below the members 17 after which the momentum of the rotary portion carries said portion until stop pawl or dog 18 mounted on the rotary portion drops into the notch 4$^g$ which again stops motion of the rotary part or carrier. Gear 23 is operated by the gear 159 driven by the train of gears mounted on the base 3.

*Sixth Movement—Article is blown.*—As head No. 1, see Fig. 1, comes to the position of head No. 2, the air pipe 25 is brought into communication with the pressure duct 186 and the article is blown while the head remains at position #2, and when the blowing is finished, the article is complete and is then carried to the position of head #5 before it is released, such length of travel being given to the completed article to give it time to cool somewhat before discharging it. The head with the completed article now travels to position #6 without further special operation of the parts, but when it reaches the position #6 the article is taken from the machine.

*Seventh Movement—True form opens half way and fore form closes half way, neck ring opens.*—As the head #1 approaches position of head No. 5 (see Fig. 1) the cam $x$ on the rotary column 4 pushes back lever 98, and through the lever 101 actuated thereby, causes clutch 102 to now engage clutch member 104 and thereby reverses motion of the shaft 89 and in consequence actuates the screw 36 so that now it swings one set of arms 47 up to open the true forms 142 and the other set of arms 47 to swing the fore forms 143 down when the clutch 33 before referred to is thrown in, it being understood that as the lever 98 is pushed back to the limit, the dog or detent 97 drops and holds the lever 98 to its shifted position. At this part of the operation of the machine, lever arm 100 is engaged by the cam $x'$ and transmits movement to intermediate connections 121—120—66—119 and 65 and thereby lifts rod 15 and throws clutch 33 in, as previously described, and thereby swings the fore and true forms to their mid positions. When the forms or molds reach their mid positions another cam $x^4$ on column 4 engages lever 100 and moves it so that rod 66 causes lever 64 to force the rod 15 down and thereby release clutch 33, which leaves the true and fore forms or molds set at their mid positions, at which they remain until the completed article is removed and the machine rotates and lever 100 is again actuated by a cam on the column 4. At this point the neck ring must open to release the article and this latter operation and means for effecting the same is explained as follows.

124 designates a rack mounted on guides 132 and suspended by a rod 123 held to freely rotate in the said rack, the latter being normally pulled to its lowest position by the weight 131 attached thereto, see Fig. 18. A gear 125 is held to mesh with the rack 124 that drives shaft 125$^a$ and bevel gear 126 which gives motion to shafts 128 and 129 through gear 127.

160 is a sleeve mounted on one arm 46, throguh which the rod 123 moves and the said sleeve has ways B', see Fig. 14 in which move stops A' as shown and for the purpose presently explained.

118, (see Fig. 6$^a$) is a lever, (one of which is mounted on the upper end of each "head") which is normally projected from the head in the horizontal plane by a spring 118$^a$, and the said lever has a cam portion 118$^b$ which causes the rod 123 when at its lowest position, to so stand that the stops A' are at right angles to the ways B', and when the rod rises the stops A' will be turned to aline with the ways B' and thereby permit the weight 131 to pull the rack 124 down. When the arm 46 descends again, the spring on lever 118 allows the cam at the bottom of the ways B' to rotate the rod 123 so that the said arm can pass and be ready to again raise rod 123. Rack 124 has a stop 124$^a$ to limit the fall thereof. In the seventh movement, just before the arm 46 reaches its mid position and stops, sleeve 160 comes up under stops A' (see Fig. 14) and raises rods 123 with rack 124 until arm 4 is stopped. As rack 124 travels upwardly it rotates gear 125, which through the connections shown, rotates the flexible shaft 129 as described, and the said movement of parts operates gear 130 and open neck ring as heretofore explained.

*Eighth movement—Table takes finished ware and lowers again.*—152 designates a bevel pinion mounted on a bracket 152$^a$ on the inside of the base, which at predetermined times is actuated by suitable gearings 152$^b$, see Fig. 16. This pinion has a crank pin 154 that fits in slot 137$^a$ of a sliding bar 137, that extends horizontally through a slot 3$^c$ in the base and pivotally connects with the crank end 136$^a$ of an arm 135, which, with two other arms 134, supports a table 133 to which the outer ends of the arms 134—135 are pivotally connected, the inner ends of said arms being pivoted at 138 to a bracket 138$^a$ projected radially from the base as clearly shown in Figs. 6$^a$ and 17. When the bar 137 is slid out, the arms 134—135 raise and bring the table 133 in position under the forms or molds to take the ware, which operation is so timed that the table takes the ware just after it was released by the neck ring devices. When arm 137 is drawn in the table 133 descends, see dotted lines on Fig. 6$^a$, from which it will be seen the table remains during its up and down movements in the horizontal position.

The operation of raising and lowering the table 133 is effected as the "head" is held at position No. 5.

In practice, a conveyer separate from the machine, receives the finished ware from table 133 when at the lower position and carries it to the leers.

*Ninth movement—Neck ring closes and turns 90°.*—When the machine begins to move, the lever 100 disengages the cam that held it up and moves under another cam $x^5$ that forces it down, and by reason of such movement of lever 100 and the parts controlled thereby, clutch 33 is thrown in as before and arm 46 begins the last half of its travel, and as soon as the arm 46 begins to move cam 118 turns the rod 123 until stop A' alines with the ways B', which now leaves rack 124 free to be pulled down by the weight 131, which movement rotates the shaft gears 125—126 and in consequence shaft 129 in a direction opposite to its former movement and thereby actuates the neck ring controlling devices to move the neck ring to close as explained.

During the operation last explained, arm 46 operates clutch 42 and as the shaft carrying gear 151 is now reversed the neck ring is turned back 90° to the point from which it started, as previously explained.

*Tenth movement—Fore form closes and true form opens.*—This last movement is going on at the same time the eighth movement is occurring, but it is not completed until after the neck ring has come to rest. This tenth movement was started under movement eight, and is stopped when "head" reaches position No. 5, except that the arm 46, in reaching the limit of its up movement, strikes rod 29, see Fig. 6, and disengages clutch 33. This movement takes the "head" to the position No. 6 and now needs only to move it to position No. 1 to complete cycle of movement of the machine.

It will be noticed in my present construction of machine, no separate bottom plate is used with the true form as the bottoms are made as a part of the said forms, see 142$^a$ and 143$^b$, the movement of the forms being such that the bottoms clear as the forms open. The fore forms are shorter than the true forms to allow for stretching in glass, while changing forms.

In the practical arrangement of my machine, the several heads 1 to 6 revolve about the column twice each minute, thereby making it possible to produce thirty-six complete articles with the construction described, per minute.

Having thus described my invention, what I claim and desire to secure by Letters Patent, is:—

1. In a glass gathering machine, a support, a carrier mounted on the support and extended radially therefrom, automatic means for raising and lowering the support at predetermined times, a glass gathering means mounted on the support, including opposing mold heads having a plurality of cores, automatic mechanism for reversibly turning said mold heads 90° at predetermined times, and means on the central support for engaging with and setting the said automatic mechanism in operation when the carrier rotates as set forth.

2. In a machine for the manufacture of hollow glass ware, a central support, a carrier rotatably mounted thereon, a forming head mounted on the carrier having a mold provided with a plurality of cores, means for drawing molten glass into the mold around the cores, means mounted on the carrier for rotating the molds, and devices on the central support adapted to set said means into action as the carrier is rotated.

3. In a machine for the manufacture of hollow glass ware, a central support, a carrier rotatably mounted thereon, a plurality of independent mechanisms or heads of like construction supported on the carrier, each of said mechanisms including a blank mold and a blowing mold, said molds being coöperatively joined and adapted to alternately open or close, means for first causing molten glass to flow into the blank mold when it is closed, and for then blowing the formed blank, a screw feed controlled means for actuating the alternate opening and closing of the molds, and devices on the carrier, and on the support adapted to coact at predetermined times to create a reversal movement of the screw feed for the purposes specified.

4. In a glass shaping machine, in combination with a stationary support, a carrier rotatably mounted on the said support, a plurality of heads mounted on the carrier, mechanism on each head for collecting a glass charge and for shaping the same, and means for intermittently rotating the carrier, of a drive mechanism in gear with all the glass charge collecting and shaping means, and means for intermittently actuating and locking the drive mechanism with the rotary carrier, and disengaging the same therefrom at predetermined times.

5. In a hollow glass ware making machine, a central support, a carrier rotatably mounted on the support, a series of radially projected heads mounted on the carrier, a glass gathering and shaping mechanism mounted on each head, a continuously rotating drive gear, a detent carried thereby, and means for automatically shifting said detent at predetermined times into engagement with the carrier to impart a partial rotation thereto, for the purposes set forth.

6. In a hollow glass ware making machine, a central support, a carrier rotatably mounted on the said support, a series of radially projected head frames mounted on the carrier, a glass gathering and shaping means mounted on each head; of a continuously rotating drive gear, a detent carried thereby and automatic mechanism for adjusting the detent to engage the carrier and move it with the gear and for disengaging the detent from the carrier at predetermined intervals.

7. In a hollow glass ware making machine, a central support, a carrier rotatably mounted thereon, a head frame mounted on and projected radially from the carrier, a glass gathering and shaping means mounted on the head, a continuously rotating drive gear, a detent carried by said gear, automatic means for moving said detent into and out of engagement with the carrier at predetermined times, and another detent mounted on the carrier for limiting the movements of the carrier after it is moved by the drive gear detent.

8. In a machine of the characetr described, the combination with a central support 4, the rotary carrier 6 having lateral projections 17 and the gravity drop detent 18 having a beveled end, the support 4 having lock seats 4ᵍ with which the detent 18 engages, and having an annular cam groove 22; of the drive gear 23 mounted in the support 4, the detent 20 having a roller 21 engaging the groove 22, said detent being movable through and carried by the gear 23 and adapted to engage with the carrier members 17, and the beveled lug 19 on the gear 23 for engaging beveled edge 18ᵃ of the detent 18 for the purposes set forth.

9. In a hollow glass ware machine, a central support, a carrier rotatably mounted thereon, said carrier including a radially projected frame, a head supported by and having vertical movement in the radial frame, a glass gathering and shaping means mounted on the said head, mechanism for shifting the said head in alternate directions, said means including a drive shaft mounted on the radial frame, a sliding clutch gearing that connects with and is driven by the main drive mechanism on the central support, shifting devices coupled with the clutch gears, means on the central support for alternately moving the shifting devices as the carrier is rotated.

10. In a machine of the character described, in combination with the central stationary support, and the main drive mechanism mounted thereon; of a carrier rotatably mounted on the support, said carrier including radial frame members, a head sustained and having vertical movement on each radial frame, a glass gathering and shaping means on each head; of mechanism mounted on the radial frames for imparting reverse movements to the heads, geared with the main drive mechanism, said reversing mechanism including a transmitting shaft, clutch mechanism thereon for imparting reverse motion to said shaft, a clutch shifting device and means on the stationary support for engaging the shifting device and moving it in alternate directions during the rotation of the carrier, as set forth.

11. In a machine for making hollow glass ware, a stationary central support, a carrier rotatably mounted on the said support, a head sustained by the carrier and having vertical movement thereon, a main drive mechanism mounted on the stationary support, means mounted on the carrier for imparting reciprocal vertical movement to the heads, said means including a drive shaft 107 geared with the main drive gearing, said shaft carrying a beveled gear 105, a transmission shaft 89, the clutch gears 103—104 mounted on the said transmission shaft and meshing with the gear 105, the sliding clutch 102, a shifting device that engages the clutch 102, cams on the stationary support with which the said shifting device engages as the carrier is rotated and by which the said device is moved in alternate directions, and glass gathering and shaping means mounted on the heads, substantially as described.

12. In a hollow glass ware making machine, a central support, a main drive mechanism mounted on the said support, said mechanism including a spur gear 109, a carrier rotatably mounted on the support, said carrier including a radial arm, a head mounted on the said arm for vertical movement with respect thereto, and having a rack member, glass gathering and shaping means mounted on the head, screw actuated gearing that engages with the rack member on the head, a transmission shaft, a sliding clutch for controlling the motion of the screw gearing, the shaft 107 geared with the spur gear 109 and carrying a beveled gear 105, the clutch gears 103—104 mounted on the transmission shaft, a clutch 102 slidably mounted on the said shaft between the gears 103—104, the lever 94 connected with and controlling the screw gearing clutch, a clutch member 101 and arms 98, cams on the stationary support with which the members 94 and 98 engage at predetermined times and devices controlled by the vertical movement of the head for shifting the screw gearing clutch in one direction as set forth.

13. In a hollow glass ware making machine, the combination with a stationary central support having a pair of air ports, one of which is in communication with an air exhausting and the other with an air blowing means, a carrier rotatably mounted on the support, a plurality of glass gathering and shaping means, each including an air leading pipe, a box mounted on the carrier having ports, one for each air leading pipe, adapted to be alternately brought in communication with the suction and the blowing air ports in the stationary support, as the carrier is rotated.

14. In a machine for making hollow glass ware, the combination with a stationary support having hub like portion and having two ports, that discharge laterally, a vacuum tank connected to one of said ports, an air compressor connected with the other port, a carrier rotatably mounted on the support, an air tight boxing movable with the carrier that turns on the hub having the air ports, a glass gathering and shaping means mounted on the carrier, said means including an air tube connected with the boxing, said boxing having a port for bringing said tube alternately in communication with the exhausting and feeding ports in the stationary hub, as set forth.

15. In a hollow glass ware making machine, the combination with the central support, the main drive gearing supported thereby, the rotary carrier, the head mounted in the carrier for vertical movement and having a rack member, and a glass gathering and shaping means mounted on the head; of a screw gear mechanism in mesh with the head rack, means for imparting reverse motion to the screw gear mechanism actuated from the main drive mechanism, said means including a shiftable clutch, devices actuated by a cam on the stationary support for shifting said clutch in one direction, and other devices for shifting said clutch in a reverse direction actuated by the down movement of the rack carrying head.

16. In combination with the stationary support, the main drive mechanism sustained thereby, and the rotary carrier, the glass gathering and shaping mechanism, a supporting head, held for vertical movements on the carrier, said head including a rack member; of a worm gear mechanism that engages with the head rack, a reversely rotatable transmission shaft, a clutch gear forming a part of the worm gear mechanism driven by said transmission shaft, means actuated by the rotation of the carrier for throwing said clutch gear out of action, a means for throwing said clutch gear back into operative position, and devices actuated by the transmission gear for setting the said clutch gear back in mesh with the transmission gear, and mechanism actuated by the down movement of the head for moving said devices in gear with the transmission shaft at predetermined times.

17. The combination with the central support, the main drive gearing, the rotary carrier, the glass gathering and shaping mechanism supporting head mounted on the carrier for vertical movement, mechanism for imparting reverse vertical movement to the head, driven from the main drive gearing, said mechanism including a transmission shaft, reversing clutch gears for controlling the direction of movement of said transmission shaft, a lever normally held to move the shiftable member of the clutches into engagement with one of the clutch gears, a cam device on the stationary member for throwing said lever to move the shiftable clutch member into mesh with the opposite clutch gear, a detent engaging said lever to hold it at its last stated position, and means for releasing said detent controlled by the upward movement of the head having the rack, as set forth.

18. In a glass shaping machine the combination with a blank forming mold and a blowing mold, and means for simultaneously and alternately opening and closing said molds and means for exhausting the air from the blank mold and blowing into blowing mold; the several molds having a plurality of mold cavities; of a neck ring having a plurality of blowing cores and means automatically actuated when the blank molds are opened to rotate the neck to 90° for the purpose specified.

19. In a hollow glass ware machine, a blank forming mold open at one end, means for moving the said end of the mold into and from a molten mass, a suction pipe having a core at the lower end, adapted to fit into the mold, automatic means for rotating the suction pipe and core as the mold is being moved into the molten glass and an air exhausting means connected to the suction pipe.

20. In a hollow glass ware machine, a blank forming mold open at one end, means for causing the mold to move into and out of a molten mass, a suction pipe having a core at the lower end adapted to fit into the glass, an air exhausting means including a conveying pipe, an air tight joint that connects the said pipe and the suction pipe, the latter having its end rotatably mounted in said joint and automatic means operable at predetermined times for rotating the air pipe and core, as set forth.

21. In a machine of the character stated, the combination with a supporting head, means for moving it toward and from the glass tank or vat, of a glass gathering and shaping means mounted on the head comprising a blank mold composed of a pair of hinged sections, a blowing mold composed of a pair of hinged sections disposed in a plane at right angles to the other sections, a cross head for each pair of hinged sections whose vertical movements open and close said sections alternate, means for simultaneously actuating the two crossheads to move in opposite directions, and devices for setting the said means into an operative condition at predetermined times, as set forth.

22. In a machine of the character described, a pair of oppositely disposed blank mold sections hingedly mounted on the head frame, another like pair of blowing molds hingedly mounted on said frame in a plane at right angles to the other sections, two cross heads, one for each set of mold members, automatic means for moving said cross heads up and down alternately, and pivotal and yieldable connections that join the mold sections and the mold head, as set forth.

23. In a glass shaping machine, the combination with a shaping means consisting of two sets of molds, one set of molds being provided for an initial shaping of the glass, the other set of molds for the final shaping of the glass, each set of molds comprising two oppositely disposed hinged members, a cross head for each set of molds, a shaft having a right and a left screw, screw nut connections that join the two cross heads with the right and left screws, means for intermittently and reversely rotating the screw.

24. In a glass shaping means, a pair of oppositely disposed mold sections, another pair of oppositely disposed mold sections positioned in a plane at right angles to the other mold sections, a supporting head, two cross heads disposed at right angles to each other, a shaft having right and left screw portions, the cross heads having screw nut portions for engaging the right and left screw portions, a drive shaft, gear connections between said shaft and the double screw shaft, said connections including a clutch gear device, means for setting said clutch into an operative position to actuate the double screw shaft and another means for shifting said clutch to stop motion to the screw shaft, automatically actuated by engagement therewith of one of the cross heads when in the limit of its upward movement.

25. The combination with the central support, the rotary carrier, the head mounted on the carrier and held for vertical reciprocable movement thereon, the alternately acting gathering and blowing molds mounted in said head, having a plurality of mold cavities, and air exhausting and blowing means cooperatively connected with the molds; of a neck ring, a plurality of mold cores sustained thereby that coöperate with the gathering and blowing molds, said neck ring including a peripherally toothed disk, a drive shaft, a gear meshing with the disk teeth, means mounted on the carrier for raising and lowering the head at predetermined times, a power transmission shaft, shiftable clutch mechanisms for coupling said shaft with the main drive gearing, and with the head raising and lowering means, said transmission shaft being geared with the drive shaft that engages the toothed disk, and means for disconnecting the drive power through the transmission shaft alternately from the said disk turning shaft and the head raising and lowering means, as set forth.

26. In a machine of the character described, the combination with a pair of opposing blowing molds of like construction disposed in a plane at right angles to the blank mold, means for simultaneously and alternately opening and closing both sets of molds, a plurality of cores for coöperating with both sets of molds, a neck ring that supports the cores, and means for imparting a reverse rotary movement to the neck ring and the cores when the two sets of molds are at a mid position.

27. In a glass gathering and shaping mechanism, the combination with the gathering mold, the supporting head frame, the mold actuating mechanism including the main drive shaft; of a cut off adapted to swing in the horizontal plane over the entrant end of the mold to form a closure member therefor, said cut off being mounted on a rack shaft, spring held to its normal position, a spur on the shaft, gear segment pivotally supported, and means actuated by the drive mechanism for moving said segment in one direction at predetermined times whereby to move the cut off under the gathering mold, as set forth.

28. In a machine of the character described, in combination with a separable blowing mold and a blower coöperating therewith; a closure table for engaging the bottom of the mold, automatic means for raising and lowering the table to and from the blowing mold at predetermined intervals, said means comprising the toggle links 134—135 connected to the table and to the machine frame, and means actuated from the drive shaft for swinging the said links.

29. In combination with the separate molds, and means for opening and closing them, alternately; of a table for forming a closure for one of the molds, means for raising and lowering the said table at predetermined times, consisting of the link arms 134—135, pivotally connected at one end to the table and at the other end to the machine frame, the link 135 having a crank arm 136ª, the pitman rod 137, the drive pinion 137ª having a wrist pin connected with the rod 137 and means actuated from the drive shaft for intermittently rotating the pinion 137ª.

30. In a machine for the manufacture of hollow glass ware, the combination with two sets of divided molds, each mold having a plurality of shaping cavities, means for opening and closing the two sets of molds alternately, a divided neck ring, a plurality of cores mounted thereon in radial alinement, means for rotating the cores independent of the neck ring, and means for rotating the neck ring with the cores whereby to shift the position of the cores, first in position to coöperate with one set of molds and then to coöperate with the other set of molds.

31. In a machine for making hollow glass ware, the following elements in combination, a divided gathering mold having a plurality of mold cavities, a similarly formed blowing mold, the latter being disposed in a plane at right angles to the gathering mold, a plurality of cores, a divided neck ring, coöperating with the cores, means for shifting the neck ring and cores to coact alternately with the gathering mold and then with the blowing mold.

32. In a machine for making hollow glass ware; the following elements in combination; a divided gathering mold having a plurality of mold cavities, a similarly formed blowing mold, the latter being disposed at right angles to the gathering mold, means for opening and closing said molds at predetermined times, a series of cores adapted to coöperate with either of the molds, a divided neck ring that carries the cores, means for rotating the cores independent of the neck ring, means for rotating the neck ring with the cores from one position to the other and means for separating the neck ring to discharge the ware when both molds are opened, as set forth.

CHRISTIAN JULIUS KOENIG.

Witnesses:
H. O. TONSOR,
C. P. HOLMES.